(12) United States Patent
Sottek

(10) Patent No.: US 11,138,687 B1
(45) Date of Patent: Oct. 5, 2021

(54) PROTOCOL-BASED GRAPHICS COMPOSITOR

(71) Applicant: Roku, Inc., San Jose, CA (US)

(72) Inventor: Matthew James Sottek, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 16/921,281

(22) Filed: Jul. 6, 2020

(51) Int. Cl.
| | | |
|---|---|---|
| *G06T 1/00* | (2006.01) |
| *G06T 1/20* | (2006.01) |
| *G06T 11/60* | (2006.01) |
| *G06F 9/54* | (2006.01) |
| *G06F 9/445* | (2018.01) |
| *G06T 3/40* | (2006.01) |

(52) U.S. Cl.
CPC ............ *G06T 1/20* (2013.01); *G06F 9/44505* (2013.01); *G06F 9/54* (2013.01); *G06T 3/40* (2013.01); *G06T 11/60* (2013.01)

(58) Field of Classification Search
None
See application file for complete search history.

(56) References Cited

U.S. PATENT DOCUMENTS

| | | | | | |
|---|---|---|---|---|---|
| 8,294,704 | B1 * | 10/2012 | Garrity | ............... | G06F 9/5027 345/418 |
| 9,001,114 | B1 * | 4/2015 | Garrity | ............... | G06T 17/005 345/418 |
| 2008/0303834 | A1 * | 12/2008 | Swift | ............... | G06T 1/20 345/522 |
| 2008/0303835 | A1 * | 12/2008 | Swift | ............... | G06T 15/005 345/522 |
| 2012/0306899 | A1 * | 12/2012 | Sandmel | ............... | G06T 1/20 345/522 |
| 2016/0027143 | A1 * | 1/2016 | Amidei | ............... | G06T 1/20 345/522 |
| 2016/0328272 | A1 * | 11/2016 | Ahmed | ............... | G06F 9/4881 |
| 2016/0328871 | A1 * | 11/2016 | Chen | ............... | G06T 1/20 |

\* cited by examiner

*Primary Examiner* — Martin Mushambo
(74) *Attorney, Agent, or Firm* — Sterne, Kessler, Goldstein & Fox P.L.L.C.

(57) ABSTRACT

Disclosed herein are system, method, and computer program product embodiments for generating protocol-based composited graphics. An embodiment operates by receiving a first set of commands configured to instruct a first application programming interface (API) to render a first graphics element. The embodiment further operates by receiving a second set of commands configured to instruct a second API to render a second graphics element. The embodiment further operates by generating a serialized set of commands comprising the first set of commands and the second set of commands. Subsequently, the embodiment operates by receiving a request to generate a frame and, in response to receiving the request to generate the frame, generating the frame based on the serialized set of commands, wherein the frame comprises the first graphics element and the second graphics element.

20 Claims, 7 Drawing Sheets

PROTOCOL-BASED GRAPHICS COMPOSITOR

BACKGROUND

Field

This disclosure is generally directed to a protocol-based graphics compositor.

Background

A graphics compositor is a system that allows multiple independent layers of graphics data to be combined into a single on-screen image. Typically, existing compositors create this combined output using hardware graphics planes or composited graphics layers.

In one example for creating a composited output using traditional hardware graphics planes, an application renders a frame for each plane by calling commands in a graphics application programming interface (API). Rendering commands are turned into rendering operations carried out by hardware or software. Some commands render to the screen, and other commands render to off-screen buffers. Rendered pixels for each plane are moved from a back buffer to a front buffer by exchange or copy. Subsequently, all planes are read at the display refresh rate and blended together to output to the display.

In one example for creating a composited output using traditional composited graphics layers, an application renders a frame for each layer by calling commands in a graphics API. Rendering commands are turned into rendering operations carried out by hardware or software. Some commands render to the screen while others render to off-screen buffers. Subsequently, rendered pixels for each layer are moved from a back buffer to a front buffer by exchange or copy. An independent compositor process reads from each layer and renders the blended result to a single frame buffer. When any single layer has been updated, all layers are read and composited again. For instance, rendered pixels for the altered layer again are moved from the back buffer to the front buffer by exchange or copy. Each layer is read and the blended result is written to a single frame buffer. This single plane is read at the display refresh rate to output to the display.

However, existing compositors fall short in many areas. For example, hardware graphics planes are a limited resource allowing only a fixed number of planes with limited position and scaling capabilities. Hardware graphics planes read all pixels for all planes once per display refresh, consuming significant memory bandwidth resources even when the pixel data remains static. Composited graphics layers require two buffers containing pixel data for each layer and an additional two buffers containing the pixel data for the composited result consuming significant graphics memory resources. When any single layer changes, all layers must be read, blended, and the result written to a single frame buffer. This consumes additional graphics processing and memory bandwidth resources. As a result, both hardware graphics planes and composited graphics layers require significant memory, computational, and memory bandwidth resources to generate on-screen images.

Additionally, modern display devices, such as TVs, monitors, tablets, smartphones, and smartwatches and other wearables, etc., are manufactured in a myriad of different screen sizes and resolutions. Accordingly, modern electronic content, such as movies, TV shows, and music, typically is scaled up or down for presentation on these devices. To do so, existing scaling methods render the graphics pixels to memory and then read, filter, and write those pixels to a copy at a different size. In one example, an application renders a frame by calling commands in a graphics API. Rendering commands then are turned into rendering operations carried out by hardware or software. Some commands render to the screen, while other commands render to off-screen buffers. Subsequently, the buffer containing the image to be scaled is read, filtered, and written out at a larger size.

However, existing scaling methods still fall short in many areas. For example, if an application rendered five squares on a screen at 1280×720p resolution but 1920×1080p resolution was needed, existing scaling methods would render the five squares at 1280×720p, read the 1280×720p pixels, scale up the 1280×720p pixels, and then write the 1280×720p pixels back out at 1920×1080p. As a result, existing scaling methods are slow, require significant computational resources, and result in substantial rendering time to generate scaled graphics.

SUMMARY

Provided herein are system, apparatus, article of manufacture, method and/or computer program product embodiments, and/or combinations and sub-combinations thereof, for generating protocol-based composited graphics. In contrast to existing approaches that render individual layers, the embodiments described herein solve these technological problems by utilizing a protocol-based graphics compositor that intercepts or captures graphics commands generated by applications and that would have been used by one or more application programming interface (APIs) to create a layer and then serializes the intercepted or captured graphics commands into a serialized command stream (e.g., including one or more serialized, commands, transcoded commands, protocols, any other suitable data or control signals, or any combination thereof) that can be stored and replayed in a composited manner by the one or more APIs at a later time (e.g., upon receipt of a request for a frame) to create the pixel data for the layer. In some embodiments, the protocol-based graphics compositor described herein combines a variable number of pixel planes with a variable number of protocol-based planes and recreates the final image by applying both pixel layers and replaying protocol layers until the final image is created.

In one illustrative and non-limiting example for creating a protocol-based composited graphics plane, an application can render a frame by calling commands in a graphics API. The protocol-based graphics compositor described herein can intercept (e.g., without application or API knowledge) or capture (e.g., with application or API knowledge) the commands and send a serialized version of the commands to a protocol-based graphics compositor process for storage. When any layer is altered, the protocol-based graphics compositor can replay the stored commands in order through the original API to render the graphics. The protocol-based graphics compositor can replay off-screen commands only once and replay on-screen commands when any layer is altered to generate a complete frame. Subsequently, the protocol-based graphics compositor can move rendered pixels from a back buffer to a front buffer by exchange or copy. Finally, the protocol-based graphics compositor can read a single plane at the display refresh rate to output to a display device.

Further provided herein are system, apparatus, article of manufacture, method and/or computer program product embodiments, and/or combinations and sub-combinations thereof, for modifying the rendering (e.g., changing the rendered position, size, orientation, color, compression, etc.) of graphics and graphics elements by transcoding a serialized stream of graphics commands. In contrast to existing approaches, the embodiments described herein solve these technological problems by intercepting or capturing a serialized command stream of graphics commands, and then modifying the rendering commands to modify (e.g., stretch, shrink, rotate, re-color, etc.) the resulting output, causing the output to be substantially equivalent to the output generated by traditional methods but with substantially no additional writes or memory requirements.

In one illustrative and non-limiting example for scaling graphics rendering, if an application issued commands to render five squares on a screen at 1280×720p resolution but 1920×1080p resolution was needed, the embodiments described herein can be configured to intercept or capture those commands, examine them, modify them by multiplying the on-screen data (e.g., destination coordinates) included therein by 1.5, and then send the modified commands to the hardware to generate the 1920×1080p image having the five modified (e.g., scaled-up) squares.

An embodiment is directed to system, apparatus, article of manufacture, method and/or computer program product embodiments, and/or combinations and sub-combinations thereof, for generating protocol-based composited graphics. In a non-limiting embodiment, the apparatus can be a media streaming device, to name just one example. The apparatus includes a memory and a processor that is communicatively coupled to the memory. In operation, in some embodiments, the processor receives a first set of commands configured to instruct a first API to render a first graphics element. In some embodiments, the processor receives a second set of commands configured to instruct a second API to render a second graphics element. In some embodiments, the processor generates a serialized set of commands comprising the first set of commands and the second set of commands. In some embodiments, the processor receives a request to generate a frame. In some embodiments, in response to receipt of the request to generate the frame, the processor generates the frame based on the serialized set of commands. In some embodiments, the frame includes the first graphics element and the second graphics element.

Another embodiment is directed to system, apparatus, article of manufacture, method and/or computer program product embodiments, and/or combinations and sub-combinations thereof, for modifying graphics rendering by transcoding a serialized command stream. In a non-limiting embodiment, the apparatus can be a media streaming device, and the serialized command stream can be a serialized stream of graphics commands, to name just two examples. The apparatus includes a memory and a processor that is communicatively coupled to the memory. In operation, in some embodiments, the processor receives a command configured to instruct an API to render a graphics element. For example, in a case where the command was generated by an application and transmitted by the application to the API, the processor can receive the command by intercepting or capturing the command after transmission of the command by the application and before any processing of the command by the API. Responsive to receiving the command, the processor generates, based on the command, a transcoded command configured to instruct the API to render a modified graphics element by applying a set of modification factors to a portion of the command. Subsequently, the processor transmits the transcoded command to the API for rendering.

There are many exemplary aspects to the system, apparatus, article of manufacture, method and/or computer program product embodiments, and/or combinations and sub-combinations thereof, disclosed herein. For example, embodiments of the present disclosure provide for a protocol-based graphics compositor that (i) saves rendering time as the pixels are rendered only one time and (ii) saves graphics memory resources because there is no additional copy of the pixel data (e.g., only the pixel data for the final image needs to exist). In another example, embodiments of the present disclosure provide for intercepting or capturing graphics commands intended for a graphics API and transcoding those commands before sending them to the API and rendering them in memory. As a result of these and other embodiments described herein, embodiments of the present disclosure provide for faster graphics rendering techniques that utilize fewer computational resources (e.g., memory, CPU percentage, GPU percentage). As a further result of these and other embodiments described herein, the rendering time to generate and update on-screen images, and to generate and update modified graphics in those on-screen images, is decreased substantially based on the utilization of composited graphics planes and transcoded commands.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
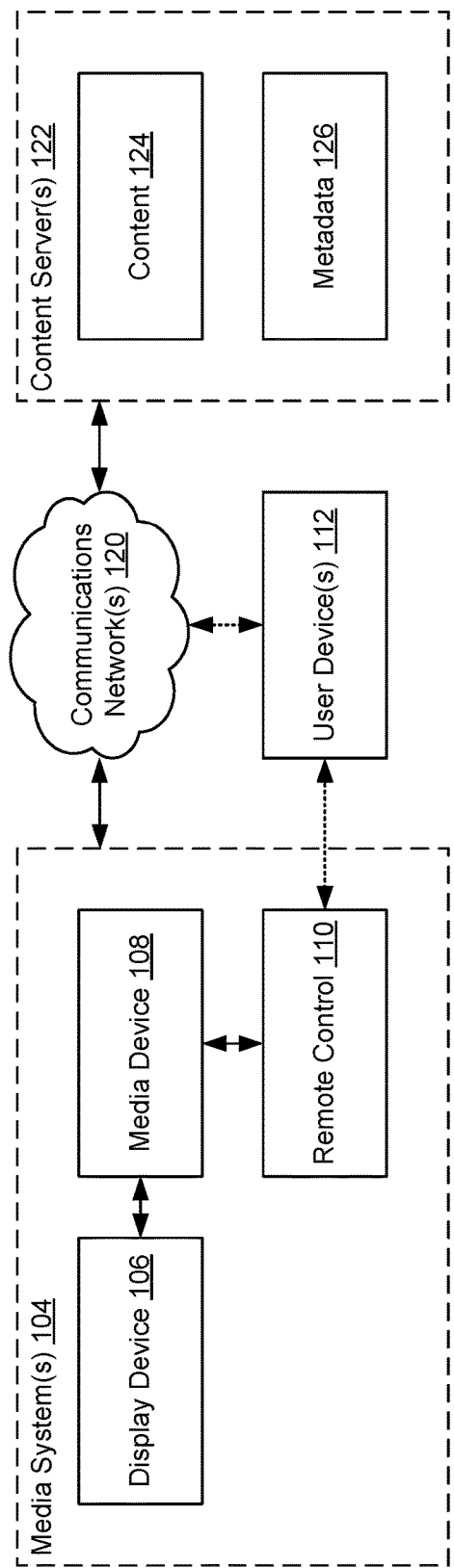
FIG. 1 illustrates a block diagram of a multimedia environment that includes one or more media systems and one or more content servers, according to some embodiments.

FIG. 1 illustrates a block diagram of multimedia environment 102, according to some embodiments. In a non-limiting example, multimedia environment 102 is directed to streaming media.

Multimedia environment 102 can include one or more media systems 104 and one or more content servers 122, communicatively coupled via one or more communications networks 120. In various embodiments, one or more communications networks 120 can include, without limitation, wired and/or wireless intranet, extranet, Internet, cellular, Bluetooth and/or any other short range, long range, local, regional, global communications network, as well as any combination thereof.

One or more media systems 104 can each include display device 106, media device 108, and remote control 110. Display device 106 can be a monitor, television, computer, smart phone, tablet, and/or projector, to name just a few examples. Media device 108 can be a streaming media device, DVD device, audio/video playback device, cable box, and/or digital video recording device, to name just a few examples. In some embodiments, media device 108 can be a part of, integrated with, operatively coupled to, and/or connected to display device 106. Media device 108 can be configured to communicate with one or more communications networks 120.

One or more user devices 112 can interact with one or more media systems 104 via remote control 110. Remote control 110 can be any component, part, apparatus or method for controlling media device 108 and/or display device 106, such as a remote control, a tablet, laptop computer, smartphone, on-screen controls, integrated control buttons, or any combination thereof, to name just a few examples.

One or more content servers 122 (also called content sources) can each include databases to store content 124 and metadata 126. Content 124 can include any combination of music, videos, movies, TV programs, multimedia, images, still pictures, text, graphics, gaming applications, advertisements, software, and/or any other content or data objects in electronic form. In some embodiments, metadata 126 includes data about content 124. For example, metadata 126 can include associated or ancillary information indicating or related to writer, director, producer, composer, artist, actor, summary, chapters, production, history, year, trailers, alternate versions, related content, applications, and/or any other information pertaining or relating to content 124. Metadata 126 can also or alternatively include links to any such information pertaining or relating to content 124. Metadata 126 can also or alternatively include one or more indexes of content 124, such as but not limited to a trick mode index.

Figure 2:
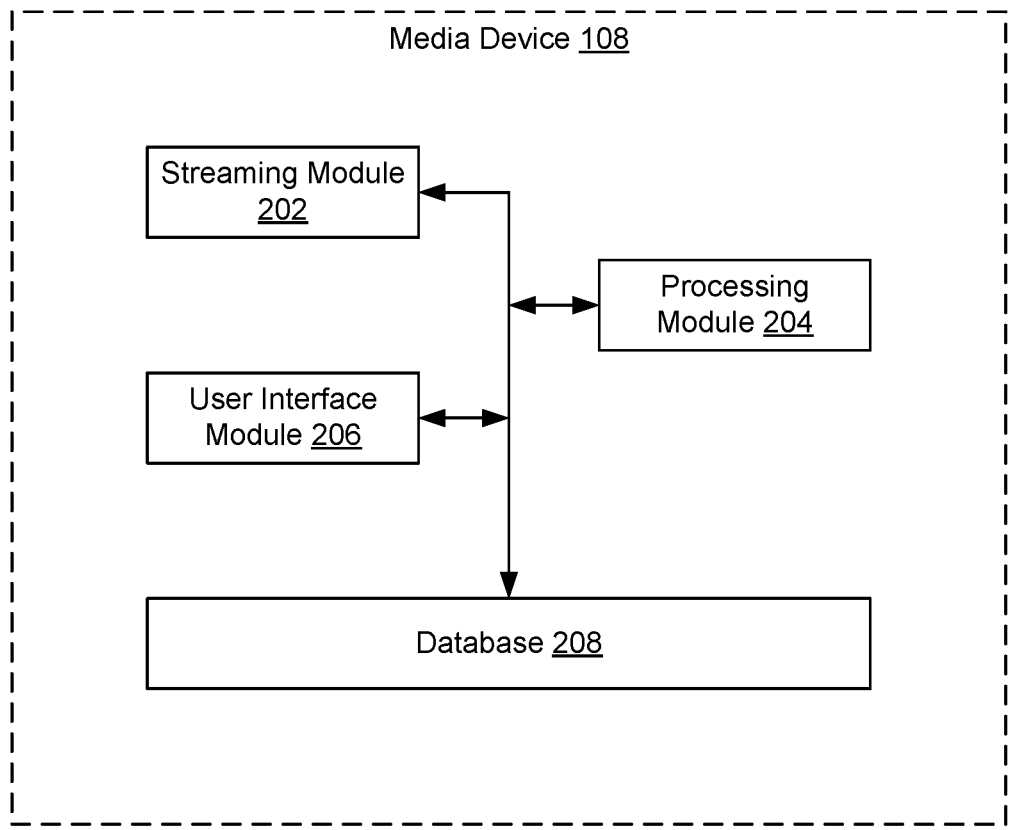
FIG. 2 illustrates a block diagram of a media device, according to some embodiments.

FIG. 2 illustrates an example block diagram of media device 108, according to some embodiments. Media device 108 can include streaming module 202, processing module 204, user interface module 206, and database 208.

Now referring to FIGS. 1 and 2, in some embodiments, one or more user devices 112 can use remote control 110 to interact with user interface module 206 of media device 108 to select content, such as a movie, TV show, music, book, application, game, etc. Streaming module 202 of media device 108 can request the selected content from one or more content servers 122 over one or more communications networks 120. One or more content servers 122 can transmit the requested content to streaming module 202. Media device 108 can transmit the received content to display device 106 for presentation to one or more users of one or more user devices 112. In streaming embodiments, streaming module 202 can transmit the content to display device 106 in real time or near real time as it receives such content from one or more content servers 122. In non-streaming embodiments, media device 108 can buffer or store the content received from one or more content servers 122 in database 208 for later playback on display device 106.

Figure 3:
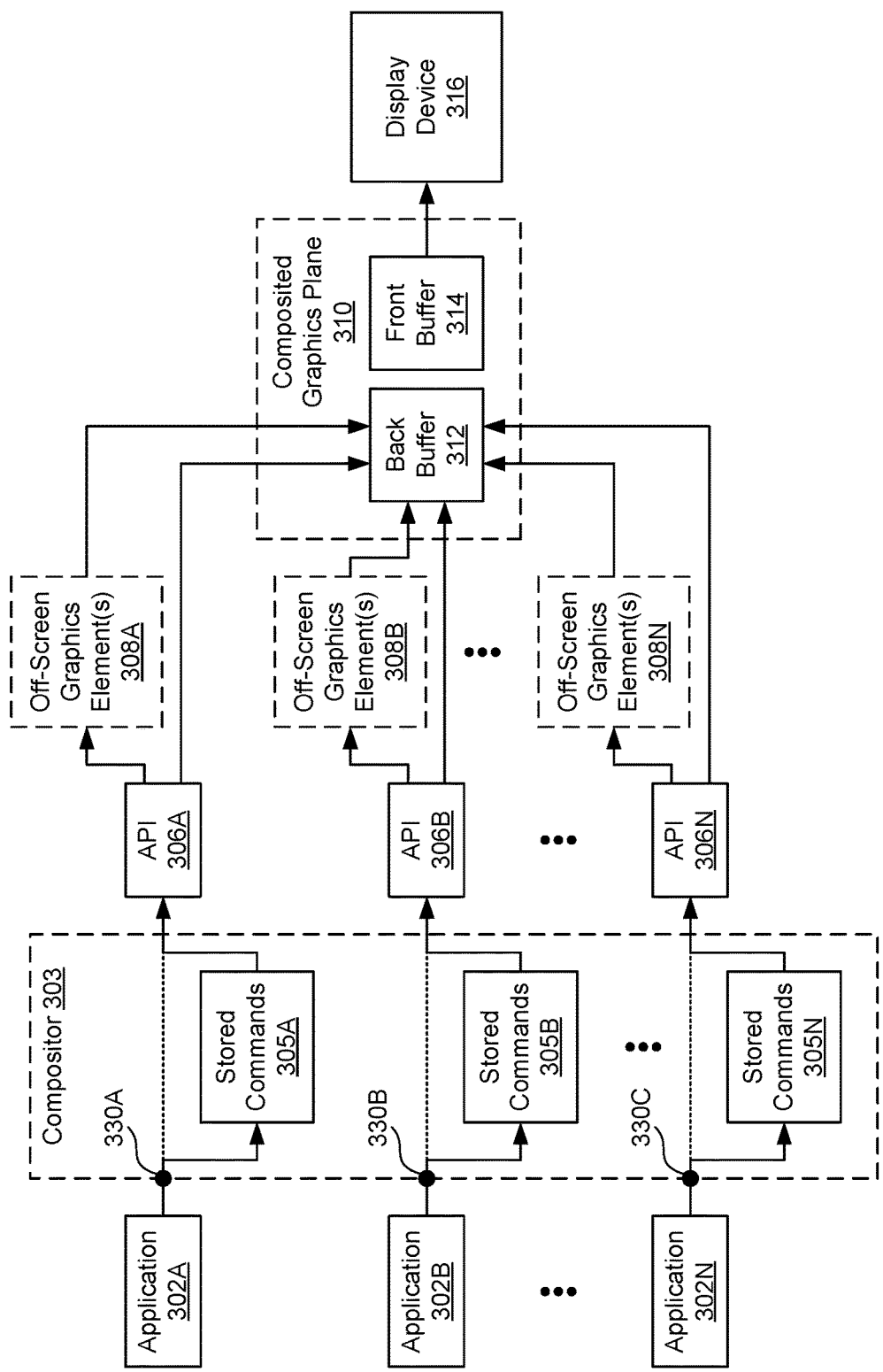
FIG. 3 is a block diagram of an example system for generating protocol-based composited graphics, according to some embodiments.

FIG. 3 is a block diagram of example system 300 for generating protocol-based composited graphics, according to some embodiments. In some embodiments, example system 300 can include a plurality of applications (e.g., applications 302A, 302B, through 302N), compositor 303, a plurality of stored commands (e.g., stored commands 305A, 305B, through 305N), a serialized set of commands generated based on the plurality of stored commands, a plurality of APIs (e.g., APIs 306A, 306B, through 306N), a plurality of off-screen graphics elements (e.g., one or more off-screen graphics elements 308A, 308B, through 308N), composited graphics plane 310 (e.g., including back buffer 312 and front buffer 314), and display device 316.

Each of the plurality of applications can generate one or more commands configured to instruct a respective one of the plurality of APIs to render a graphics element in a frame (e.g., a rendered frame, screen, plane, window, image, overlay (e.g., display screen overlay), or any other suitable element). For example, application 302A can attempt to render a first graphics element in a frame by calling one or more graphics commands in API 306A, and application 302B can attempt to render a second graphics element in the frame by calling one or more graphics commands in API 306B.

Compositor 303 can intercept or capture the commands, serialize the intercepted or captured commands, and store the serialized commands in one or more electronic storage devices. For example, at 330A, compositor 303 can intercept (e.g., without the knowledge of either application 302A or API 306A) or capture (e.g., with the knowledge of one or both of application 302A and API 306A) the commands generated by application 302A, serialize the intercepted or captured commands, and store the serialized commands in one or more electronic storage devices as stored commands 305A. In another example, at 330B, compositor 303 can intercept (e.g., without the knowledge of either application 302B or API 306B) or capture (e.g., with the knowledge of one or both of application 302B and API 306B) the commands generated by application 302B, serialize the intercepted or captured commands, and store the serialized commands in one or more electronic storage devices as stored commands 305B. In some embodiments, compositor 303 can transmit some or all of the intercepted or captured commands to a transcoder for transcoding (e.g., as described with reference to FIGS. 4 and 6).

Compositor 303 can serialize the plurality of stored commands to generate a serialized set of commands and store the serialized set of commands in one or more electronic storage devices. Subsequently, in response to receipt of a request to generate the frame, compositor 303 can transmit a respective subset of the serialized set of commands to each of the plurality of APIs for use in generation of composited graphics plane 310. For example, in response to receipt of the request, compositor 303 can transmit stored commands 305A to API 306A, transmit stored commands 305B to API 306B, and transmit stored commands 305B to API 306B.

In some embodiments, when any layer is altered, example system 300 can replay the plurality of stored commands in order through their respective API to render composited graphics plane 310. For example, to generate composited graphics plane 310, example system 300 can replay off-screen commands only once, whereas example system 300 can replay on-screen commands anytime a layer is altered.

The plurality of APIs can process the stored commands to generate respective sets of on-screen graphics elements and store the generated sets of on-screen graphics elements in back buffer 312 of composited graphics plane 310. The sets of on-screen graphics elements can include on-screen graphics elements such as on-screen squares, rectangles, cylinders, fonts, images, sequences of images, videos, overlays, any other suitable graphics elements, and any combinations thereof. For example, API 306A can process stored commands 305A to generate a first set of on-screen graphics elements and store the generated first set of on-screen graphics elements in back buffer 312; API 306B can process stored commands 305B to generate a second set of on-screen graphics elements and store the generated second set of on-screen graphics elements in back buffer 312; and API 306N can process stored commands 305N to generate an N-th set of on-screen graphics elements and store the generated N-th set of on-screen graphics elements in back buffer 312.

In addition, the plurality of APIs can process the stored commands to generate respective sets of off-screen graphics elements and store the generated respective sets of off-screen graphics elements in memory. Subsequently, the plurality of APIs can generate additional sets of on-screen elements based on the respective sets of off-screen graphics elements and store the generated additional sets of off-screen graphics elements in back buffer 312. For example, API 306A can process stored commands 305A to generate one or more off-screen graphics elements 308A, generate an additional first set of on-screen elements based on one or more off-screen graphics elements 308A, and store the generated additional first set of on-screen graphics elements in back buffer 312; API 306B can process stored commands 305B to generate one or more off-screen graphics elements 308B, generate an additional second set of on-screen elements based on one or more off-screen graphics elements 308B, and store the generated additional second set of on-screen graphics elements in back buffer 312; API 306N can process stored commands 305N to generate one or more off-screen graphics elements 308N, generate an additional N-th set of on-screen elements based on one or more off-screen graphics elements 308N, and store the generated additional N-th set of on-screen graphics elements in back buffer 312. In some embodiments, example system 300 can move (e.g., by exchange or copy) rendered pixels from back buffer 312 to front buffer 314.

In some embodiments, example system 300 can transmit composited graphics plane 310 (e.g., the composited result of the layers) to display device 316, which can receive composited graphics plane 310 and read a single plane (e.g., a single layer of pixels) at the display refresh rate for output to a display implemented by display device 316.

In some embodiments, example system 300 can serialize commands from applications into a stored command stream that can be replayed at a later time to create pixel data for composited graphics plane 310. In some embodiments, example system 300 can combine a variable number of pixel planes with a variable number of protocol-based planes and generate composited graphics plane 310 by applying both pixel layers and replaying protocol layers until composited graphics plane 310 is created. As a result, example system 300 can save rendering time as the pixels are rendered only one time. Additionally, example system 300 can save video memory resources because there is no additional copy of the pixel data; only the pixel data for composited graphics plane 310 needs to exist.

Figure 4:
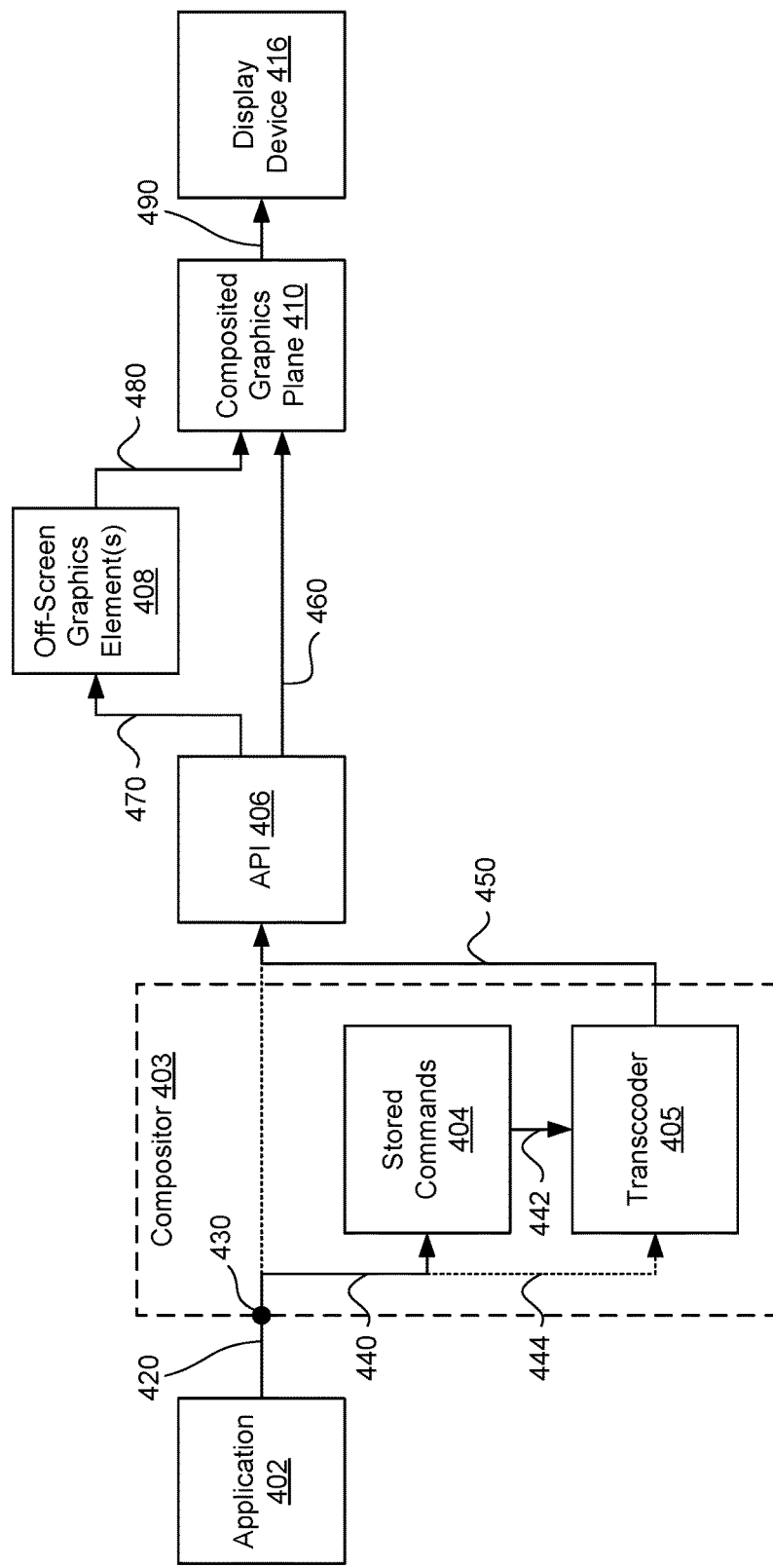
FIG. 4 is a block diagram of an example system for modifying graphics rendering by transcoding a serialized command stream, according to some embodiments.

FIG. 4 is a block diagram of example system 400 for modifying graphics rendering by transcoding a serialized command stream, according to some embodiments. In some embodiments, example system 400 can include application 402, compositor 403, transcoder 405, stored commands 404 (e.g., a serialized set of commands), API 406 (e.g., a graphics API), one or more off-screen graphics elements 408, composited graphics plane 410, and display device 416.

At 420, application 402 can generate one or more commands configured to instruct API 406 to render a graphics element in a frame (e.g., a rendered frame, screen, plane, window, image, overlay (e.g., display screen overlay), or any other suitable element). For example, application 402 can attempt to render a frame by calling one or more graphics commands in API 406.

At 430, compositor 403 can intercept (e.g., without the knowledge of either application 402 or API 406) or capture (e.g., with the knowledge of one or both of application 402 and API 406) the commands. At 440, compositor 403 can serialize the intercepted or captured commands and store the serialized commands as stored commands 404 in the one or more electronic storage devices. Additionally or alternatively, in some embodiments, at 444, compositor 403 can transmit one or more of the intercepted or captured commands to transcoder 405. In some embodiments, at 442, compositor 403 can transmit stored commands 404 to transcoder 405.

In some embodiments, as part of replay, transcoder 405 determines whether to alter one or more of the commands in the serialized version of the intercepted or captured commands. Accordingly, transcoder 405 can accommodate changed circumstances such as if the reason for the transcoding changes between when the commands were stored and when they are replayed. In some embodiments, transcoder 405 modifies commands targeting onscreen pixels to generate transcoded commands configured to result in approximately the same pixel output as graphics that have been rendered and stored to memory prior to modification. In some embodiments, transcoder 405 leaves commands targeting off-screen pixels unchanged. In one illustrative and non-limiting example, transcoder 405 can be configured to modify an example command to generate an example rectangle in an example frame by generating scaling factors and applying the generated scaling factors to the on-screen destination data included in the command according to the following example pseudocode (which is provided for illustrative purposes and is not limiting):

Received command (e.g., intercepted or captured command):
  copy_rect(srcX, srcY, srcW, srcH, dstX, dstY, dstW, dstH),
  where srcX and srcY refer to source X and Y coordinates in the XY-plane,
  srcW and srcH refer to source width and height,
  dstX and dstY refer to destination X and Y coordinates in the XY-plane, and
  dstW and dstH refer to destination width and height.
Transcoded command:
  copy_rect(srcX, srcY, srcW, srcH, dstX*scaleX, dstY*scaleY, dstW*scaleX, dstH*scaleY),
  where scaleX and scaleY refer to X and Y scaling factors.

As shown above, the copy_rect command includes: a source rectangle that is not modified by transcoder 405 because the source rectangle is off screen; and a destination rectangle that is modified by transcoder 405 to make the destination rectangle larger than what application 402 expected it to be (e.g., destination X, destination Y, destination width, and destination height are all scaled up by a subset of scaling factors).

In some embodiments, transcoder 405 can be configured to generate the transcoded command by accessing a database that includes a set of transcoding rules respectively associated with a set of commands (e.g., graphics rendering commands). For example, the set of rules can include a subset of copy_rect transcoding rules stored in association with a copy_rect command. The subset of copy_rect transcoding rules can include, for example, electronic instructions to: (i) not modify the source data; (ii) modify the destination data; and (iii) if the source data is on-screen source data, modify the source data as well.

In another illustrative and non-limiting example, transcoder 405 can receive an example command to close application 402 in composited graphics plane 410, referred to in this example as a "delete command." For example, application 402 can generate a delete command configured to slide a window associated with application 402 off the side of composited graphics plane 410 on exit. Without the knowledge of application 402 or API 406, transcoder 405 can transcode the received delete command to instruct API 406 to delete the window in a different manner than the manner called for by application 402.

In some embodiments, transcoder 405 can transcode the received delete command without generating new frames such that there is a one-to-one (1:1) relationship or correlation between input frames and output frames. For example, transcoder 405 can be configured to modify the received delete command by generating pixel alteration factors configured to fade the window associated with application 402 in composited graphics plane 410 on exit rather than sliding it off the side of composited graphics plane 410 as commanded by application 402. In this example, application 402 can generate a series of commands configured to generate a series of frames each having a window with a modified X location in composited graphics plane 410. Transcoder 405 can intercept the series of commands and modify the intercepted series of commands to fade the window in composited graphics plane 410 rather than modify the window's X location. In other words, transcoder 405 can transcode the received commands that were intended to modify the X location of the window into transcoded commands that instead modify the transparency of the window, thereby altering the exit effect without the knowledge of application 402 or API 406. In some embodiments, when application 402 generates commands calling for twenty frames that move a window off screen on exit, transcoder 405 instead can instruct API 406 to generate twenty frames that fade the window off screen on exit.

In other embodiments, transcoder 405 can transcode the received delete command into multiple animated frames such that there is not a 1:1 relationship or correlation between input frames and output frames (e.g., by replaying all the commands to generate new frames). For example, transcoder 405 can be configured to modify the received delete command by generating scaling factors configured to shrink, spin, and throw away the window associated with application 402 in composited graphics plane 410 rather than sliding it off the side of composited graphics plane 410 as commanded by application 402. In this example, transcoder 405 can modify the destination X and Y coordinates, the destination width and height, and the destination orientation so that the icon becomes smaller and spins as it is removed from composited graphics plane 410 rather than being deleted as called for by the received delete command.

In another illustrative and non-limiting example, transcoder 405 can be configured to modify the colors in graphics data. For example, transcoder 405 can receive an example command to draw pixels at a certain color in an example frame. Transcoder 405 can be configured to modify the received example command by generating pixel alteration factors configured to alter the color of the pixels and applying those pixel alteration factors to the pixels to generate a transcoded command configured to instruct API 406 to render, in composited graphics plane 410, an altered-color version of the to-be-drawn pixels called for the received example command. In another example, where the received example command is a command to generate a rectangular image, transcoder 405 can be configured to modify the received example command by applying pixel alteration factors to the pixels of the to-be-generated rectangular image in the received example command to generate a transcoded command configured to instruct API 406 to render, in composited graphics plane 410, a version of the rectangular image that is slightly more red than the rectangular image called for by the received example command.

In another illustrative and non-limiting example, application 402 may be sending compressed pixel data to API 406, such as an image (e.g., a PNG image), and transcoder 405 can be configured to modify that image. For example, transcoder 405 can decompress the image, modify the decompressed pixel data, store the modified pixel data, and then, in response to generate the image in a rendered frame, transmit the stored pixel data to API 406 using a different command that accepts uncompressed data. As a result, the computing costs (e.g., memory, CPU, GPU) associated with recompressing the image to a new PNG image, sending it to API 406, and decompressing it again are substantially eliminated.

In some embodiments, transcoder 405 can receive (e.g., by interception or capture) multiple commands generated by application 402 and generate a single command based on those multiple commands or a subset thereof. In some embodiments, transcoder 405 can receive a single command generated by application 402 and generate multiple commands based on that single command. In some embodiments, transcoder 405 can generate a serialized version of the intercepted or captured commands for transcoding (e.g., potential modification of one or more of the intercepted or captured commands).

At 450, transcoder 405 transmits stored commands 404 to API 406. Stored commands 404 transmitted to API 406 can include, for example, transcoded commands including one or more modified commands and one or more unmodified commands.

At 460, API 406 can process the transcoded commands to generate a first set of on-screen graphics elements and store the generated first set of on-screen graphics elements in one or more buffers (e.g., which can include a front buffer and a back buffer) for use in generation of composited graphics plane 410. The first set of on-screen graphics elements can include one or more unmodified on-screen graphics elements and one or more modified on-screen graphics elements. The one or more modified on-screen graphics elements can include, for example, one or more modified on-screen squares, rectangles, cylinders, fonts, images, sequences of images, videos, overlays, any other suitable graphics elements, and any combinations thereof.

At 470, API 406 can process the transcoded commands to generate one or more off-screen graphics elements 408 and store one or more off-screen graphics elements 408 in memory. At 480, example system 400 can generate a second set of on-screen graphics elements based on one or more off-screen graphics elements 408 and store the generated second set of on-screen graphics elements in one or more buffers for use in generation of composited graphics plane 410. One or more off-screen graphics elements 408 can include one or more unmodified off-screen graphics elements (e.g., configured to remain off-screen) and one or more modified off-screen graphics elements (e.g., configured to be included on-screen in a display implemented by display device 416 via 480 and 490). The one or more modified off-screen graphics elements can include, for example, one or more modified off-screen squares, rectangles, cylinders, fonts, images, sequences of images, videos, overlays, any other suitable graphics elements, and any combinations thereof.

At 480, example system 400 can utilize the first and second sets of on-screen graphics elements stored in one or more buffers (e.g., including, but not limited to, a back buffer and a front buffer) to generate composited graphics plane 410. In some embodiments, at 460, 470, and 480, example system 400 can generate composited graphics plane 410 based on one or more transcoded commands, one or more non-transcoded commands (e.g., relating to some off-screen graphics elements), one or more off-screen graphics elements 408 (including, but not limited to, one or more unmodified off-screen graphics elements, one or more modified off-screen graphics elements, or a combination thereof), one or more on-screen graphics elements (including, but not limited to, one or more unmodified on-screen graphics elements, one or more modified on-screen graphics elements, or a combination thereof), any other suitable command or graphics element, or any combinations thereof. In some embodiments, the one or more modified graphics elements may not "exist" anywhere other than in composited graphics plane 410. For example, a resized square may not exist as an element in regular size that then is resized. Rather, the resized square simply may have been drawn as a smaller square by example system 400 in composited graphics plane 410 based on a transcoded command received from transcoder 405.

In some embodiments, in 450, API 406 can receive one or more on-screen commands from compositor 403 and, in 460, process the one or more on-screen commands to draw one or more on-screen graphics elements directly to composited graphics plane 410. The one or more on-screen commands can include one or more modified on-screen commands (e.g., transcoded by transcoder 405) and one or more unmodified on-screen commands (e.g., not transcoded by transcoder 405). For example, one illustrative example of a modified on-screen command that can be processed by API 406 in 460 is where the command includes on-screen source data and on-screen destination data associated with a graphics element, such as when copying the left half of a screen to the right half of the screen.

In some embodiments, in 450, API 406 can receive one or more off-screen commands from compositor 403 and, in 470, process the one or more off-screen commands to draw one or more off-screen graphics elements 408. The one or more off-screen commands can include one or more modified off-screen commands (e.g., transcoded by transcoder 405) and one or more unmodified off-screen commands (e.g., not transcoded by transcoder 405). Subsequently, in 480, API 406 can process one or more additional commands (e.g., off-to-on-screen commands) to draw from one or more off-screen graphics elements 408 to composited graphics plane 410. The one or more additional commands can include one or more modified additional commands (e.g., transcoded by transcoder 405) and one or more unmodified additional commands (e.g., not transcoded by transcoder 405). For example, the copy_rect( ) pseudo code described above is one illustrative example of a modified additional command that can be processed by API 406 in 480.

At 490, example system 400 can read, based on composited graphics plane 410, a single plane at the display refresh rate for output to a display implemented by display device 416.

Figure 5:
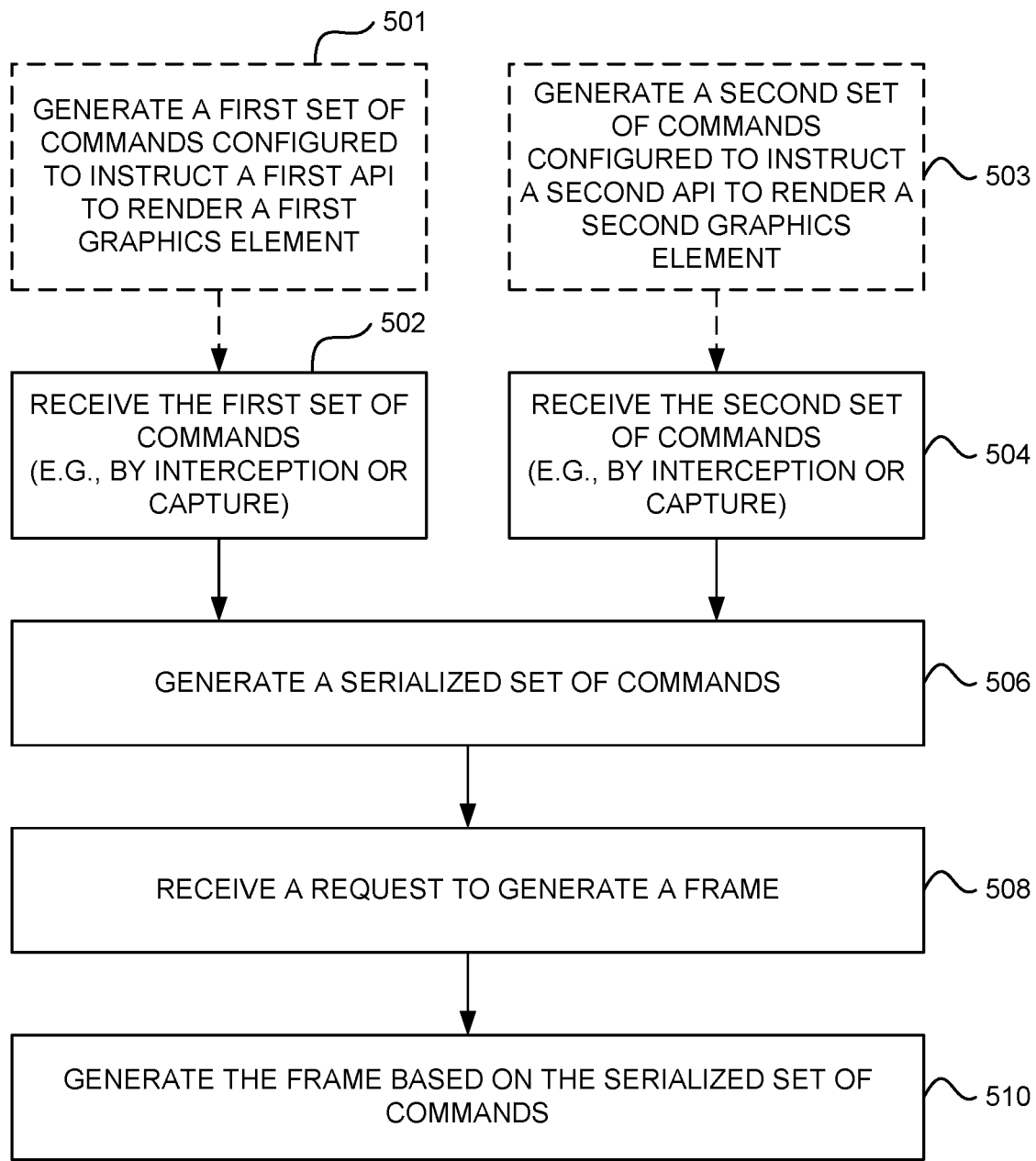
FIG. 5 is a flowchart illustrating a process for generating protocol-based composited graphics, according to some embodiments.

FIG. 5 is a flowchart for a method 500 for generating protocol-based composited graphics, according to an embodiment. Method 500 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 3. However, method 500 is not limited to that example embodiment.

Optionally, in 501, application 302A generates a first set of commands (e.g., graphics commands) configured to instruct API 306A to render a first graphics element in a frame. The first graphics element can include a square, a rectangle, a cylinder, a font, an image, a sequence of images (e.g., video), an icon, any other suitable graphics element, an overlay including any of these graphics elements, or any combination thereof. In some embodiments, the first set of commands can include: first off-screen data associated with the first graphics element; and first on-screen data associated with the first graphics element. The first off-screen data can include, for example, first off-screen source data (e.g., srcX, srcY, srcW, and srcH) associated with the first graphics element; and first on-screen destination data (e.g., dstX, dstY, dstW, and dstH) associated with the first graphics element. In other embodiments, the first set of commands can include first on-screen source data and first on-screen destination data associated with the first graphics element, such as where the first set of commands are configured to instruct API 306A to copy a left-hand portion of a screen (or a horizontally-flipped copy of the left-hand portion of the screen) to a right-hand portion of the screen.

In 502, compositor 303 receives (e.g., by interception or capture) the first set of commands generated by application 302A. In some embodiments, the first set of commands may have been generated by application 302A and transmitted by application 302A to API 306A. In some embodiments, compositor 303 can receive the first set of commands after transmission of the first set of commands by application 302A and before any processing of the first set of commands by API 306A. In some embodiments, compositor 303 can generate stored commands 305A by storing the first set of commands in one or more electronic storage devices.

In some embodiments, application 302A and API 306A can have no knowledge of compositor 303, such as in cases where application 302A and API 306A are incapable of being modified (e.g., by example system 300) to include knowledge of compositor 303. For example, without the knowledge of either application 302A or API 306A, compositor 303 can intercept the first set of commands after transmission of the first set of commands by application 302A but before any receipt of any of the first set of commands by API 306A. In another example, compositor 303 can prevent receipt of the first set of commands by API 306A by, for example, intercepting and storing the first set of commands before they are received by API 306A.

In some embodiments, application 302A, API 306A, or both can be modified (e.g., by example system 300) to include knowledge of compositor 303. For example, with the knowledge of one or both of application 302A and API 306A, compositor 303 can capture the first set of commands after receipt of the first set of commands by API 306A but before any processing of the first set of commands by API 306A. In another example, compositor 303 can prevent processing of the first set of commands by API 306A by, for example, capturing and storing the first set of commands after they are received by API 306A but before they are processed by API 306A.

Optionally, in 503, application 302B generates a second set of commands configured to instruct API 306B to render a second graphics element in the frame. The second graphics element can include a square, a rectangle, a cylinder, a font, an image, a sequence of images (e.g., video), an icon, any other suitable graphics element, an overlay including any of these graphics elements, or any combination thereof. In some embodiments, the second set of commands can include: second off-screen data associated with the second graphics element; and second on-screen data associated with the second graphics element. The second off-screen data can include, for example, second off-screen source data associated with the second graphics element; and second on-screen destination data associated with the second graphics element. In other embodiments, the second set of commands can include second on-screen source data and second on-screen destination data associated with the second graphics element, such as where the second set of commands are configured to instruct API 306B to copy an upper portion of a screen (or a vertically-flipped copy of the upper portion of the screen) to a lower portion of the screen.

In 504, compositor 303 receives (e.g., by interception or capture) the second set of commands generated by application 302B. In some embodiments, the second set of commands may have been generated by application 302B and transmitted by application 302B to API 306B. In some embodiments, compositor 303 can receive the second set of commands after transmission of the second set of commands by application 302B and before any processing of the second set of commands by API 306B. In some embodiments, compositor 303 can generate stored commands 305B by storing the second set of commands in one or more electronic storage devices.

In some embodiments, application 302B and API 306B can have no knowledge of compositor 303, such as in cases where application 302B and API 306B are incapable of being modified (e.g., by example system 300) to include knowledge of compositor 303. For example, without the knowledge of either application 302B or API 306B, compositor 303 can intercept the second set of commands after transmission of the second set of commands by application 302B but before any receipt of any of the second set of commands by API 306B. In another example, compositor 303 can prevent receipt of the second set of commands by API 306B by, for example, intercepting and storing the second set of commands before they are received by API 306B.

In some embodiments, application 302B, API 306B, or both can be modified (e.g., by example system 300) to include knowledge of compositor 303. For example, with the knowledge of one or both of application 302B and API 306B, compositor 303 can capture the second set of commands after receipt of the second set of commands by API 306B but before any processing of the second set of commands by API 306B. In another example, compositor 303 can prevent processing of the second set of commands by API 306B by, for example, capturing and storing the second set of commands after they are received by API 306B but before they are processed by API 306B.

In 506, compositor 303 generates a serialized set of commands comprising the first set of commands and the second set of commands. For example, compositor 303 can generate the serialized set of commands based on commands included in stored commands 305A and 305B. In some embodiments, compositor 303 can receive multiple commands generated by applications 302A and 302B and generate the serialized set of commands based on those multiple commands or a subset thereof. In some embodiments, compositor 303 can receive a single command generated by application 302A or 302B and generate multiple commands for inclusion in the serialized set of commands based on that single command. In 506, compositor 303 generates the serialized set of commands by serializing stored commands 305A and 305B into a stored command stream that can be replayed at a later time to generate pixel data (e.g., in response to receipt of a request to generate a frame).

In 508, compositor 303 receives a request to generate a frame (e.g., composited graphics plane 310). For example, compositor 303 can receive the request from example system 300. In another example, example system 300 can receive a user input from one of one or more user devices 112 (e.g., via remote control 110 in response to a user input such as pressing a button, making a gesture, or speaking a vocal command), generate a request to generate or update composited graphics plane 310, or a request to generate or modify an graphics element therein, and transmit the request to compositor 303.

In some embodiments, compositor 303 can prevent processing of the serialized set of commands before receipt of the request to generate the frame. In some embodiments, compositor 303 can prevent processing of the first set of commands by API 306A before receipt of the request to generate the frame. In some embodiments, compositor 303 can prevent processing of the second set of commands by API 306B before receipt of the request to generate the frame.

In 510, in response to receipt of the request to generate the frame, compositor 303 generates the frame based on the serialized set of commands. For example, in response to receipt of the request to generate the frame, compositor 303 can generate the frame by retrieving the serialized set of commands, transmitting a first subset of the serialized set of commands to API 306A, and transmitting a second subset of the serialized set of commands to API 306B.

The generated frame includes the first graphics element and the second graphics element. In some embodiments, the first graphics element comprises a first electronic overlay, and the second graphics element comprises a second electronic overlay different from the first electronic overlay. For example, the first electronic overlay comprises an image overlay, and the second electronic overlay comprises a text overlay.

In some embodiments, compositor 303 can render the pixel data for composited graphics plane 310 only once without generating an additional copy of the pixel data or a subset thereof. In one illustrative and non-limiting example, compositor 303 can generate the frame by combining a variable number of pixel planes with a variable number of protocol-based planes based on the serialized set of commands. Subsequently, compositor 303 can generate the frame by applying both pixel layers and replaying protocol layers until the frame is created.

In some embodiments, where the serialized set of commands comprises a subset of on-screen commands and a subset of off-screen commands, compositor 303 can generate the frame by processing the subset of on-screen commands and processing the subset of off-screen commands. After generation of the frame, compositor 303 can receive an electronic indication that a layer in the frame has been altered and, in response to receipt of the electronic indication that the layer in the frame has been altered, process the subset of on-screen commands and not process any of the subset of off-screen commands.

In some embodiments, compositor 303 can generate, based on the first set of commands and a first set of modification factors, a first subset of transcoded commands configured to instruct API 306A to render a first modified graphics element. In some embodiments, compositor 303 can generate, based on the second set of commands and a second set of modification factors, a second subset of transcoded commands configured to instruct API 306B to render a second modified graphics element. In some embodiments, the serialized set of commands can include the first subset of transcoded commands and the second subset of transcoded commands.

In some embodiments, the first set of modification factors, the second set of modification factors, or both can include a subset of scaling factors (e.g., position, size, orientation, and other suitable scaling factors), a subset of pixel alteration factors (e.g., color, hue, luminance, chrominance, and other suitable pixel alteration factors), a subset of decompression factors (e.g., decoding, dequantization, inverse transformation, and other suitable decompression factors), any other suitable modification factors, or any combination thereof. The first modified graphics element, the second modified graphics element, or both can include, for example, one or more modified squares, rectangles, cylinders, fonts, images, sequences of images, overlays, other suitable graphics elements, or any combination thereof.

In some embodiments, the first set of commands can include: first off-screen data (e.g., off-screen source data such as srcX, srcY, srcW, and srcH) associated with the first graphics element; and first on-screen data (e.g., on-screen destination data such as dstX, dstY, dstW, and dstH) associated with the first graphics element. In some embodiments, to generate the first subset of transcoded commands, compositor 303 can apply the first set of modification factors to the first on-screen data associated with the first graphics element and not apply the first set of modification factors to the first off-screen data associated with the first graphics element. For example, compositor 303 can apply a subset of scaling factors, such as scaleX and scaleY, to the on-screen destination data, resulting in scaled destination data such as dstX*scaleX, dstY*scaleY, dstW*scaleX, and dstH*scaleY. Continuing this example, compositor 303 can not apply the first set of modification factors to the first off-screen data associated with the first graphics element, resulting in unmodified off-screen source data such as srcX, srcY, srcW, and srcH. In such embodiments, compositor 303 leaves commands targeting off-screen pixels unchanged. For example, for a serialized set of commands that includes commands to draw a rectangle to off-screen memory and then copy that rectangle to the screen, compositor 303 can intercept and modify the command to copy the rectangle to the screen without modifying command to draw the rectangle to off-screen memory.

In some embodiments, the first off-screen data comprises first source data associated with the first graphics element, and the first on-screen data comprises first destination data associated with the first graphics element. In some embodiments, the first graphics element comprises a rectangle, and the first modified graphics element comprises a modified rectangle. In some embodiments, the first graphics element comprises a font, and the first modified graphics element comprises a modified font. In some embodiments, the first set of modification factors comprises a first subset of scaling factors.

Similarly, in some embodiments, the second set of commands can include: second on-screen data associated with the second graphics element; and second off-screen data associated with the second graphics element. In some embodiments, to generate the second subset of transcoded commands, compositor 303 can apply the second set of modification factors to the second on-screen data associated with the second graphics element and not apply the second set of modification factors to the second off-screen data associated with the second graphics element.

Figure 6:
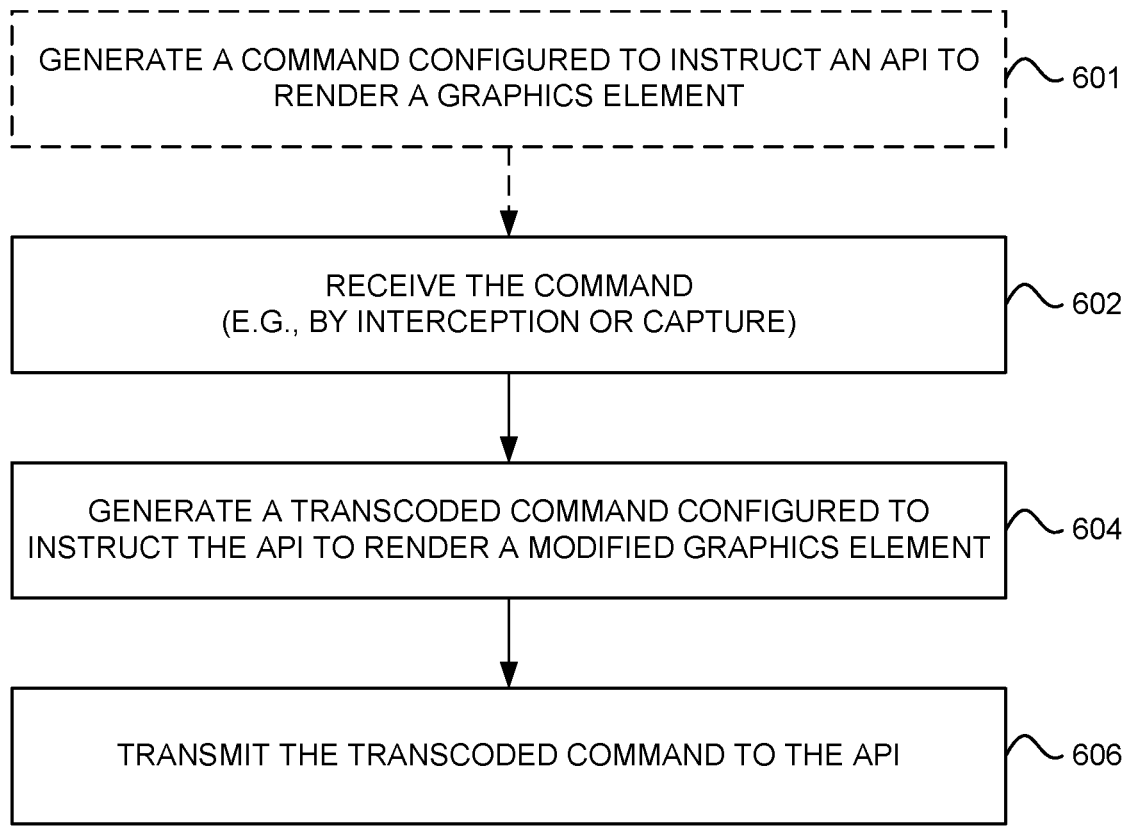
FIG. 6 is a flowchart illustrating a process for modifying graphics rendering by transcoding a serialized command stream, according to some embodiments.

FIG. 6 is a flowchart for a method 600 for modifying graphics rendering by transcoding a serialized command stream, according to an embodiment. Method 600 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 4. However, method 600 is not limited to that example embodiment.

Optionally, in 601, application 402 generates one or more commands (e.g., graphics commands) configured to instruct API 406 to render a graphics element in a frame. The graphics element can include, for example, one or more squares, rectangles, cylinders, fonts, images, sequences of images overlays, other suitable graphics elements, or any combination thereof. In some embodiments, the one or more commands can include: off-screen data associated with the graphics element; and on-screen data associated with the graphics element. The off-screen data can include, for example, off-screen source data (e.g., srcX, srcY, srcW, and srcH) associated with the graphics element; and on-screen destination data (e.g., dstX, dstY, dstW, and dstH) associated with the graphics element. In other embodiments, the one or more commands can include on-screen source data and on-screen destination data associated with the graphics element, such as where the one or more commands are configured to instruct API 406 to copy the left half of a screen (or a horizontally-flipped copy of the left half of the screen) to the right half of the screen. In some embodiments, the graphics element can include a square, a rectangle, a cylinder, a font, an image, a sequence of images (e.g., a video), any other suitable graphics element, an overlay including any of these graphics elements, or any combination thereof.

In 602, transcoder 405 receives (e.g., by interception or capture) the one or more commands generated by application 402. In some embodiments, the one or more commands may have been generated by application 402 and transmitted by application 402 to API 406. In some embodiments, transcoder 405 can receive (e.g., intercept or capture) the one or more commands after transmission of the one or more commands by application 402 and before any processing of the one or more commands by API 406. In one example, in some embodiments, API 406 can receive one or more of the one or more commands or one or more portions thereof (e.g., relating to one or more off-screen graphics elements 408, or one or more operations that are not to be transcoded). In another example, in some embodiments, API 406 can never receive the one or more commands or any portion thereof and instead receive only a transcoded versions of the one or more commands.

In some embodiments, application 402 and API 406 can have no knowledge of transcoder 405, such as in cases where application 402 and API 406 are incapable of being modified (e.g., by example system 400) to include knowledge of transcoder 405. For example, without the knowledge of either application 402 or API 406, transcoder 405 can intercept the one or more commands after transmission of the one or more commands by application 402 but before any receipt of the one or more commands by API 406. In another example, transcoder 405 can prevent receipt of the one or more commands by API 406 by, for example, intercepting and transcoding the one or more commands before they are received by API 406.

In some embodiments, application 402, API 406, or both can be modified (e.g., by example system 400) to include knowledge of transcoder 405. For example, with the knowledge of one or both of application 402 and API 406, transcoder 405 can capture the one or more commands after receipt of the one or more commands by API 406 but before any processing of the one or more commands by API 406. In another example, transcoder 405 can prevent processing of the one or more commands by API 406 by, for example, capturing and transcoding the one or more commands after they are received by API 406 but before they are processed by API 406.

In some embodiments, transcoder 405 can receive multiple commands generated by application 402 and generate a single command for transcoding (e.g., possible modification) based on those multiple commands or a subset thereof. In some embodiments, transcoder 405 can receive a single command generated by application 402 and generate multiple commands for transcoding based on that single command. In some embodiments, transcoder 405 can receive a set of commands configured to instruct API 406 to render a set of graphics elements in a frame and generate a serialized set of commands configured to instruct API 406 to render (e.g., via composited graphics plane 410) a set of modified graphics elements in a display implemented by display device 416 based on the received set of commands.

In 604, transcoder 405 generates, based on the received one or more commands (e.g., the one or more intercepted or captured commands generated by application 402), one or more transcoded commands configured to instruct API 406 to render one or more modified graphics elements in composited graphics plane 410 by applying a set of modification factors to a portion or subset of the one or more commands (e.g., on-screen data associated with the graphics element). In some embodiments, the set of modification factors can include a subset of scaling factors (e.g., position, size, orientation, and other suitable scaling factors), a subset of pixel alteration factors (e.g., color, hue, luminance, chrominance, and other suitable pixel alteration factors), a subset of decompression factors (e.g., decoding, dequantization, inverse transformation, and other suitable decompression factors), any other suitable modification factors, or any combination thereof. The modified graphics element can include, for example, one or more modified squares, rectangles, cylinders, fonts, images, sequences of images overlays, other suitable graphics elements, or any combination thereof.

In some embodiments, where the one or more commands include off-screen data (e.g., off-screen source data such as srcX, srcY, srcW, and srcH) and on-screen data (e.g., on-screen destination data such as dstX, dstY, dstW, and dstH) associated with the graphics element, the applying the set of modification factors to the portion or subset of the one or more commands can include: applying the set of modification factors to the on-screen data associated with the graphics element (e.g., applying a subset of scaling factors, such as scaleX and scaleY, to the on-screen destination data, resulting in scaled destination data such as dstX*scaleX, dstY*scaleY, dstW*scaleX, and dstH*scaleY); and not applying the set of modification factors to the off-screen data associated with the graphics element (e.g., resulting in unmodified off-screen source data such as srcX, srcY, srcW, and srcH). In such embodiments, transcoder 405 leaves commands targeting off-screen pixels unchanged. For example, for a serialized set of graphics commands that includes commands to draw a rectangle to off-screen memory and then copy that rectangle to the screen, transcoder 405 can intercept and modify the command to copy the rectangle to the screen without modifying command to draw the rectangle to off-screen memory.

In some embodiments, where the one or more commands include on-screen source data and on-screen destination data associated with the graphics element, such as when copying the left half of a screen to the right half of the screen, applying the set of modification factors to the portion or subset of the one or more commands can include: applying the set of modification factors to the on-screen data associated with the graphics element (e.g., applying a subset of scaling factors, such as scaleX and scaleY, to the on-screen source data and the on-screen destination data, resulting in scaled on-screen data such as srcX*scaleX, srcY*scaleY, srcW*scaleX, srcH*scaleY, dstX*scaleX, dstY*scaleY, dstW*scaleX, and dstH*scaleY).

In some embodiments, transcoder 405 can generate a serialized set of transcoded commands based on a serialized set of commands, where the serialized set of transcoded commands includes the one or more transcoded commands.

In an embodiment, 604 can be implemented according to the example pseudocode described with reference to transcoder 405 shown in FIG. 4. However, in other embodiments, 604 can be implemented using other code, pseudocode, algorithms, modification factors, or combinations thereof.

In 606, transcoder 405 transmits the one or more transcoded commands to API 406. In some embodiments, API 406 receives the one or more transcoded commands and renders one or more modified graphics elements (and, in some embodiments, one or more unmodified graphics elements) in composited graphics plane 410 based on the one or more transcoded commands.

Figure 7:
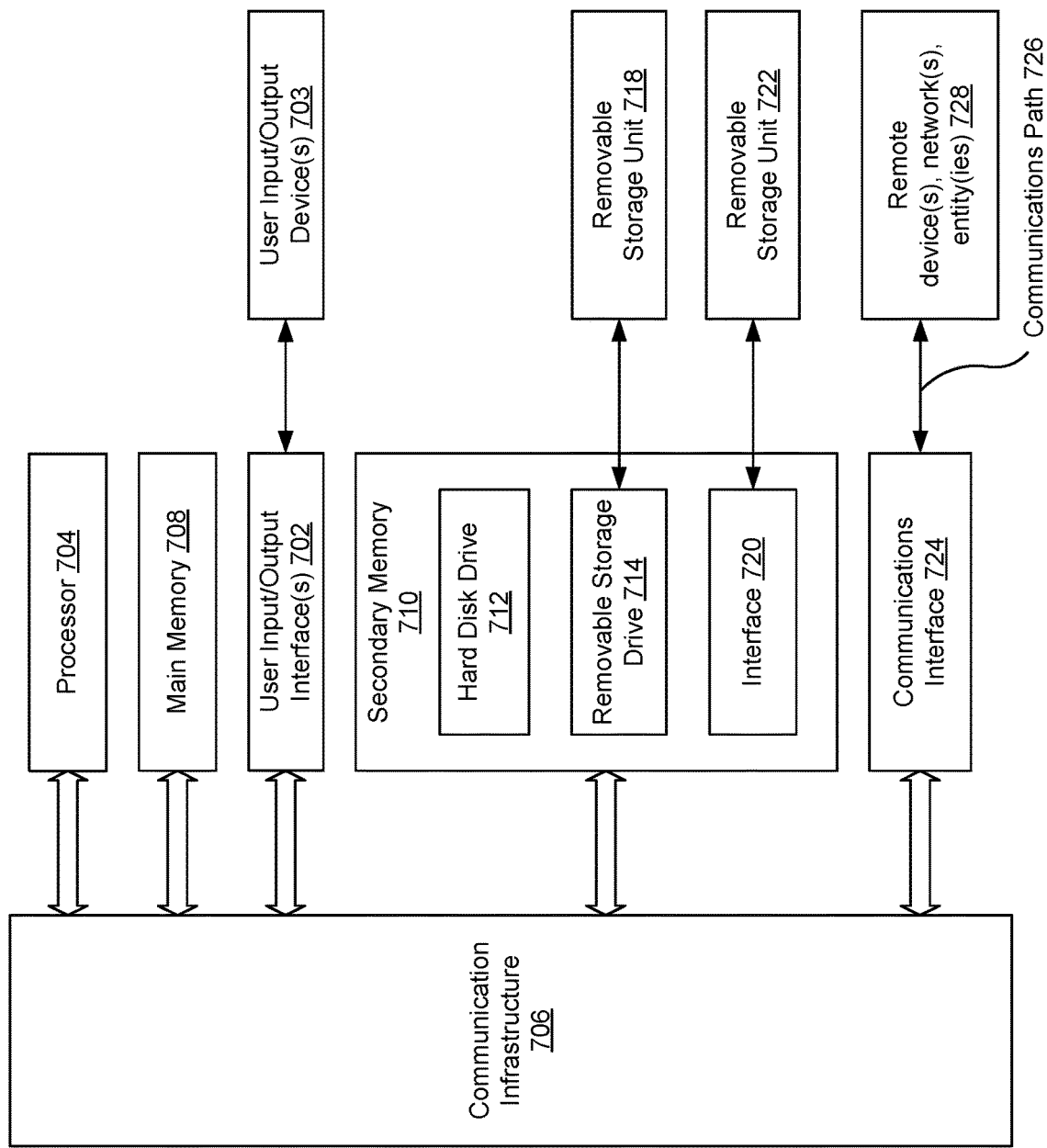
FIG. 7 illustrates an example computer system useful for implementing various embodiments.

Various embodiments and/or components therein can be implemented, for example, using one or more computer systems, such as computer system 700 shown in FIG. 7. Computer system 700 can be any computer or computing device capable of performing the functions described herein. For example, computer system 700 can be used to implement any of the embodiments described herein, as well as combinations and sub-combinations thereof.

Computer system 700 includes one or more processors (also called central processing units, or CPUs), such as processor 704. Processor 704 is connected to communications infrastructure 706 (e.g., a bus).

In some embodiments, processor 704 can be a graphics processing unit (GPU). In some embodiments, a GPU may be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communications infrastructure 706 through user input/output interface(s) 702.

Computer system 700 also includes main memory 708 (e.g., a primary memory or storage device), such as random access memory (RAM). Main memory 708 can include one or more levels of cache. Main memory 708 may have stored therein control logic (i.e., computer software) and/or data.

Computer system 700 can also include one or more secondary storage devices or memories such as secondary memory 710. Secondary memory 710 can include, for example, hard disk drive 712, removable storage drive 714 (e.g., a removable storage device), or both. Removable storage drive 714 can be a floppy disk drive, a magnetic tape drive, a compact disk drive, an optical storage device, tape backup device, and/or any other storage device/drive.

Removable storage drive 714 can interact with removable storage unit 718. Removable storage unit 718 includes a computer usable or readable storage device having stored thereon computer software (e.g., control logic) and/or data. Removable storage unit 718 can be a floppy disk, magnetic tape, compact disk, DVD, optical storage disk, and/any other computer data storage device. Removable storage drive 714 may read from and/or write to removable storage unit 718.

In some embodiments, secondary memory 710 can include other means, devices, components, instrumentalities or other approaches for allowing computer programs and/or other instructions and/or data to be accessed by computer system 700. Such means, devices, components, instrumentalities or other approaches can include, for example, removable storage unit 722 and interface 720. Examples of removable storage unit 722 and interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communications interface 724 (e.g., a network interface). Communications interface 724 may enable computer system 700 to communicate and interact with any combination of external or remote devices, external or remote networks, remote entities, etc. (individually and collectively referenced by reference number 728). For example, communications interface 724 can allow computer system 700 to communicate with external or remote devices 728 over communications path 726, which can be wired, wireless, or a combination thereof, and which can include any combination of LANs, WANs, the Internet, etc. Control logic and/or data can be transmitted to and from computer system 700 via communications path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards and specifications associated with images, audio, video, streaming (e.g., adaptive bitrate (ABR) streaming, content feeds), high-dynamic-range (HDR) video, text (e.g., closed captioning, subtitles), metadata (e.g., content metadata), data interchange, data serialization, data markup, digital rights management (DRM), encryption, any other suitable function or purpose, or any combination thereof. Alternatively, proprietary data structures, formats or schemas may be used, either exclusively or in combination with another standard or specification.

Standards and specifications associated with images may include, but are not limited to, Base Index Frames (BIF), Bitmap (BMP), Graphical Interchange Format (GIF), Joint Photographic Experts Group (JPEG or JPG), Portable Network Graphics (PNG), any other suitable techniques (e.g., functionally similar representations), any predecessors, successors, and variants thereof, and any combinations thereof.

Standards and specifications associated with audio may include, but are not limited to, Advanced Audio Coding (AAC), AAC High Efficiency (AAC-HE), AAC Low Complexity (AAC-LC), Apple Lossless Audio Codec (ALAC), Audio Data Transport Stream (ADTS), Audio Interchange File Format (AIFF), Digital Theater Systems (DTS), DTS Express (DTSE), Dolby Digital (DD or AC3), Dolby Digital Plus (DD+ or Enhanced AC3 (EAC3)), Dolby AC4, Dolby Atmos, Dolby Multistream (MS12), Free Lossless Audio Codec (FLAC), Linear Pulse Code Modulation (LPCM or PCM), Matroska Audio (MKA), Moving Picture Experts Group (MPEG)-1 Part 3 and MPEG-2 Part 3 (MP3), MPEG-4 Audio (e.g., MP4A or M4A), Ogg, Ogg with Vorbis audio (Ogg Vorbis), Opus, Vorbis, Waveform Audio File Format (WAVE or WAV), Windows Media Audio (WMA), any other suitable techniques, any predecessors, successors, and variants thereof, and any combinations thereof.

Standards and specifications associated with video may include, but are not limited to, Alliance for Open Media (AOMedia) Video 1 (AV1), Audio Video Interleave (AVI), Matroska Video (MKV), MPEG-4 Part 10 Advanced Video Coding (AVC or H.264), MPEG-4 Part 14 (MP4), MPEG-4 Video (e.g., MP4V or M4V), MPEG-H Part 2 High Efficiency Video Coding (HEVC or H.265), QuickTime File Format (QTFF or MOV), VP8, VP9, WebM, Windows Media Video (WMV), any other suitable techniques, any predecessors, successors, and variants thereof, and any combinations thereof.

Standards and specifications associated with streaming may include, but are not limited to, Adaptive Streaming over HTTP, Common Media Application Format (CMAF), Direct Publisher JavaScript Object Notation (JSON), HD Adaptive Streaming, HTTP Dynamic Streaming, HTTP Live Streaming (HLS), HTTP Secure (HTTPS), Hypertext Transfer Protocol (HTTP), Internet Information Services (IIS) Smooth Streaming (SMOOTH), Media RSS (MRSS), MPEG Dynamic Adaptive Streaming over HTTP (MPEG-DASH or DASH), MPEG transport stream (MPEG-TS or TS), Protected Interoperable File Format (PIFF), Scalable HEVC (SHVC), any other suitable techniques, any predecessors, successors, and variants thereof, and any combinations thereof.

Standards and specifications associated with HDR video may include, but are not limited to, Dolby Vision, HDR10 Media Profile (HDR10), HDR10 Plus (HDR10+), Hybrid Log-Gamma (HLG), Perceptual Quantizer (PQ), SL-HDR1, any other suitable techniques, any predecessors, successors, and variants thereof, and any combinations thereof.

Standards and specifications associated with text, metadata, data interchange, data serialization, and data markup may include, but are not limited to, Internet Information Services (IIS) Smooth Streaming Manifest (ISM), IIS Smooth Streaming Text (ISMT), Matroska Subtitles (MKS), SubRip (SRT), Timed Text Markup Language (TTML), Web Video Text Tracks (WebVTT or WVTT), Comma-Separated Values (CSV), Extensible Markup Language (XML), Extensible Hypertext Markup Language (XHTML), XML User Interface Language (XUL), JSON, MessagePack, Wireless Markup Language (WML), Yet Another Markup Language (YAML), any other suitable techniques, any predecessors, successors, and variants thereof, and any combinations thereof.

Standards and specifications associated with DRM and encryption may include, but are not limited to, Advanced Encryption Standard (AES) (e.g., AES-128, AES-192, AES-256), Blowfish (BF), Cipher Block Chaining (CBC), Cipher Feedback (CFB), Counter (CTR), Data Encryption Standard (DES), Triple DES (3DES), Electronic Codebook (ECB), FairPlay, Galois Message Authentication Code (GMAC), Galois/Counter Mode (GCM), High-bandwidth Digital Content Protection (HDCP), Output Feedback (OFB), PlayReady, Propagating CBC (PCBC), Trusted Execution Environment (TEE), Verimatrix, Widevine, any other suitable techniques, any predecessors, successors, and variants thereof, and any combinations thereof, such as AES-CBC encryption (CBCS), AES-CTR encryption (CENC).

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. An apparatus, comprising:
   a memory; and
   at least one processor coupled to the memory and configured to:
      receive a first set of commands configured to instruct a first application programming interface (API) to render a first graphics element;
      receive a second set of commands configured to instruct a second API to render a second graphics element;
      generate a serialized set of commands comprising the first set of commands and the second set of commands;
      receive a request to generate a frame; and
      in response to receipt of the request to generate the frame,
         generate the frame based on the serialized set of commands,
         wherein the frame comprises the first graphics element and the second graphics element.

2. The apparatus of claim 1, wherein:
   the first set of commands was generated by a first application and transmitted by the first application to the first API;

the second set of commands was generated by a second application and transmitted by the second application to the second API; and the at least one processor is further configured to:
receive the first set of commands after transmission of the first set of commands by the first application and before any processing of any of the first set of commands by the first API; and
receive the second set of commands after transmission of the second set of commands by the second application and before any processing of any of the second set of commands by the second API.

3. The apparatus of claim 2, wherein:
to receive the first set of commands, the at least one processor is configured to:
intercept the first set of commands after transmission of the first set of commands by the first application and before any receipt of any of the first set of commands by the first API; and
to receive the second set of commands, the at least one processor is configured to:
intercept the second set of commands after transmission of the second set of commands by the second application and before any receipt of any of the second set of commands by the second API.

4. The apparatus of claim 2, wherein:
to receive the first set of commands, the at least one processor is configured to:
capture the first set of commands after receipt of the first set of commands by the first API and before any processing of any of the first set of commands by the first API; and
to receive the second set of commands, the at least one processor is configured to:
capture the second set of commands after receipt of the second set of commands by the second API and before any processing of any of the second set of commands by the second API.

5. The apparatus of claim 1, the at least one processor further configured to:
prevent processing of the first set of commands by the first API before receipt of the request to generate the frame; and
prevent processing of the second set of commands by the second API before receipt of the request to generate the frame.

6. The apparatus of claim 1, wherein:
the serialized set of commands comprises:
a subset of on-screen commands; and
a subset of off-screen commands;
to generate the frame, the at least one processor is configured to:
process the subset of on-screen commands; and
process the subset of off-screen commands; and
after generation of the frame, the at least one processor is further configured to:
receive an electronic indication that a layer in the frame has been altered;
in response to receipt of the electronic indication that the layer in the frame has been altered:
process the subset of on-screen commands; and
not process any of the subset of off-screen commands.

7. The apparatus of claim 1, wherein:
the first graphics element comprises a first electronic overlay; and
the second graphics element comprises a second electronic overlay different from the first electronic overlay.

8. The apparatus of claim 7, wherein:
the first electronic overlay comprises an image overlay; and
the second electronic overlay comprises a text overlay.

9. The apparatus of claim 1, the at least one processor further configured to:
generate, based on the first set of commands and a first set of modification factors, a first subset of transcoded commands configured to instruct the first API to render a first modified graphics element,
wherein the serialized set of commands comprises the first subset of transcoded commands.

10. The apparatus of claim 9, wherein:
the first set of commands comprises:
first on-screen data associated with the first graphics element; and
first off-screen data associated with the first graphics element; and
to generate the first subset of transcoded commands, the at least one processor is configured to:
apply the first set of modification factors to the first on-screen data associated with the first graphics element; and
not apply the first set of modification factors to the first off-screen data associated with the first graphics element.

11. The apparatus of claim 10, wherein:
the first off-screen data comprises first source data associated with the first graphics element; and
the first on-screen data comprises first destination data associated with the first graphics element.

12. The apparatus of claim 9, wherein:
the first graphics element comprises a rectangle; and
the first modified graphics element comprises a modified rectangle.

13. The apparatus of claim 9, wherein:
the first graphics element comprises a font; and
the first modified graphics element comprises a modified font.

14. The apparatus of claim 9, wherein the first set of modification factors comprises a first subset of scaling factors.

15. The apparatus of claim 9, the at least one processor further configured to:
generate, based on the second set of commands and a second set of modification factors, a second subset of transcoded commands configured to instruct the second API to render a second modified graphics element,
wherein the serialized set of commands further comprises the second subset of transcoded commands.

16. The apparatus of claim 15, wherein:
the second set of commands comprises:
second on-screen data associated with the second graphics element; and
second off-screen data associated with the second graphics element; and
to generate the second subset of transcoded commands, the at least one processor is configured to:
apply the second set of modification factors to the second on-screen data associated with the second graphics element; and
not apply the second set of modification factors to the second off-screen data associated with the second graphics element.

17. A computer-implemented method for generating protocol-based composited graphics, comprising:
- receiving, by at least one processor, a first set of commands configured to instruct a first application programming interface (API) to render a first graphics element;
- receiving, by the at least one processor, a second set of commands configured to instruct a second API to render a second graphics element;
- generating, by the at least one processor, a serialized set of commands comprising the first set of commands and the second set of commands;
- receiving, by the at least one processor, a request to generate a frame; and
- in response to receiving the request to generate the frame, generating, by the at least one processor, the frame based on the serialized set of commands,
- wherein the frame comprises the first graphics element and the second graphics element.

18. The computer-implemented method of claim 17, wherein:
- the first set of commands was generated by a first application and transmitted by the first application to the first API;
- the second set of commands was generated by a second application and transmitted by the second application to the second API; and
- the receiving the first set of commands further comprises:
  - receiving, by the at least one processor, the first set of commands after transmission of the first set of commands by the first application and before any processing of any of the first set of commands by the first API; and
- the receiving the second set of commands further comprises:
  - receiving, by the at least one processor, the second set of commands after transmission of the second set of commands by the second application and before any processing of any of the second set of commands by the second API.

19. The computer-implemented method of claim 17, further comprising:
- generating, by the at least one processor based on the first set of commands and a first set of modification factors, a first subset of transcoded commands configured to instruct the first API to render a first modified graphics element,
- wherein the serialized set of commands comprises the first subset of transcoded commands.

20. A non-transitory computer-readable medium having instructions stored thereon that, when executed by at least one computing device, cause the at least one computing device to perform operations comprising:
- receiving a first set of commands configured to instruct a first application programming interface (API) to render a first graphics element;
- receiving a second set of commands configured to instruct a second API to render a second graphics element;
- generating a serialized set of commands comprising the first set of commands and the second set of commands;
- receiving a request to generate a frame; and
- in response to receiving the request to generate the frame, generating the frame based on the serialized set of commands,
- wherein the frame comprises the first graphics element and the second graphics element.

* * * * *